United States Patent
Brooks et al.

(10) Patent No.: US 10,625,770 B2
(45) Date of Patent: Apr. 21, 2020

(54) AUTOMATIC STEERING WITH SELECTIVE ENGAGEMENT OF FOUR-WHEEL STEERING

(71) Applicant: CNH Industrial America LLC, New Holland, PA (US)

(72) Inventors: Nathan P. Brooks, Manitowoc, WI (US); Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 220 days.

(21) Appl. No.: 15/695,734

(22) Filed: Sep. 5, 2017

(65) Prior Publication Data

US 2019/0071115 A1 Mar. 7, 2019

(51) Int. Cl.
*B62D 5/04* (2006.01)
*A01B 69/04* (2006.01)
(Continued)

(52) U.S. Cl.
CPC ............ *B62D 5/046* (2013.01); *A01B 69/008* (2013.01); *B62D 7/142* (2013.01); *B62D 7/1509* (2013.01);
(Continued)

(58) Field of Classification Search
CPC ...... B62D 5/046; B62D 7/142; B62D 7/1509; A01B 69/008; G05D 1/0278; G05D 2201/0201
(Continued)

(56) References Cited

U.S. PATENT DOCUMENTS

| 4,315,555 | A | 2/1982 | Schritt |
| 4,609,064 | A | 9/1986 | Suzuki et al. |

(Continued)

FOREIGN PATENT DOCUMENTS

| CN | 10383472 A | 6/2014 |
| GB | 2144087 A | 2/1985 |

OTHER PUBLICATIONS

Miller et al.; Control and Evaluation Methods for Multi-Mode Steering; pp. 357-366 in Automation Technology for Off-Road Equipment, Proceedings of the Jul. 26-27, 2002 Conference (Chicago, Illinois, USA) Publication Date Jul. 26, 2002, ASAE Publication No. 701P0502, ed. Qin Zhang—(11) pages.

*Primary Examiner* — Thomas G Black
*Assistant Examiner* — Wae L Louie
(74) *Attorney, Agent, or Firm* — Rebecca L. Henkel; Rickard K. DeMille

(57) ABSTRACT

Automatic steering and four-wheel steering are configured on an agricultural machine so that when automatic steering is enabled, a control system selectively activates and deactivates four-wheel steering depending on sensed turning or non-turning states of the machine. When automatic steering is enabled, the machine can automatically steer, such as according to a prescription map. In straightaway paths, corresponding to non-turning states, the control system can activate two-wheel steering. However, in the headlands of fields, corresponding to turning states, the control system can activate four-wheel steering. Such turning states can be determined based on the machines location on the map. Alternatively, such turning states can be determined based on sensed turning of the wheels. When an operator takes control of steering, such as by turning the steering wheel, automatic steering can disable, and the control system can (Continued)

activate four-wheel steering, to provide an optimum state for turning in the headlands of fields.

20 Claims, 5 Drawing Sheets

(51) Int. Cl.
*B62D 7/14* (2006.01)
*G05D 1/02* (2020.01)
*B62D 7/15* (2006.01)

(52) U.S. Cl.
CPC ... *G05D 1/0278* (2013.01); *G05D 2201/0201* (2013.01)

(58) Field of Classification Search
USPC .......................................................... 701/50
See application file for complete search history.

(56) References Cited

U.S. PATENT DOCUMENTS

| | | | |
|---|---|---|---|
| 4,958,698 A | 9/1990 | Kirschner | |
| 5,996,722 A | 12/1999 | Price | |
| 6,067,782 A | 5/2000 | Diekhans | |
| 6,488,113 B1 | 12/2002 | Worpell et al. | |
| 6,827,176 B2 | 12/2004 | Bean et al. | |
| 9,096,127 B2* | 8/2015 | Matsuzaki | B60W 10/06 |
| 9,550,527 B2* | 1/2017 | Brooks | A01C 23/00 |
| 2007/0131473 A1 | 6/2007 | Jonasson et al. | |
| 2014/0074340 A1 | 3/2014 | Wilson et al. | |
| 2015/0012181 A1 | 1/2015 | Brunnert et al. | |
| 2016/0318465 A1* | 11/2016 | Brooks | B60K 35/00 |
| 2016/0318550 A1* | 11/2016 | Brooks | A01C 23/00 |
| 2017/0010619 A1* | 1/2017 | Foster | G05D 1/0223 |
| 2018/0177177 A1* | 6/2018 | Crowley | B60G 3/01 |
| 2018/0257454 A1* | 9/2018 | Brooks | B60H 1/00807 |
| 2018/0327021 A1* | 11/2018 | Brooks | B62D 7/148 |
| 2019/0022687 A1* | 1/2019 | Brooks | B05B 15/55 |
| 2019/0071115 A1* | 3/2019 | Brooks | B62D 7/142 |
| 2019/0135171 A1* | 5/2019 | Brooks | B60Q 3/80 |

* cited by examiner

AUTOMATIC STEERING WITH SELECTIVE ENGAGEMENT OF FOUR-WHEEL STEERING

FIELD OF THE INVENTION

The invention relates generally to agricultural product application equipment such as self-propelled sprayers and, in particular, to a steering control system in which a steering controller is configured to activate a two-wheel steering mode when automatic steering mode is enabled and selectively switch to a four-wheel steering mode when the automatic steering mode is enabled and the steering controller determines that a turn of the steering wheels is greater than a threshold.

BACKGROUND OF THE INVENTION

Agricultural machines, such as self-propelled agricultural sprayers, may provide conventional two-wheel steering or four-wheel steering options. In a conventional two-wheel steering configuration, a machine may be steered left or right via two or more wheels in the front, while two or more wheels in the rear of the machine are held in a substantially straight direction with respect to the machine. In a four-wheel steering configuration, the machine may be steered left or right via wheels in the front and rear both turning. For example, to turn left, wheels in the front may turn left while wheels in the rear turn right, and to turn right, wheels in the front may turn right while wheels in the rear turn left.

Agricultural machines may also provide automatic steering in addition to conventional steering. Automatic steering may allow an onboard computer system to control steering of the sprayer according to a predetermined travel plan. Although both four-wheel steering and automatic steering are beneficial, it is typically desirable to deactivate four-wheel steering when automatic steering is enabled. That is because four-wheel steering provides a relatively large steering response for a given steering input, which can make automatic steering more difficult.

At certain times, operators may want to take over manual steering control and disengage automatic steering. When this happens, the operators may want to activate four-wheel steering, such as one when making tight turns in the headlands of fields. However, this can require a lot of control manipulation by the operator to engage and disengage four-wheel steering when switching to manual steering, thereby increasing complexity and susceptibility to error. It is therefore desirable to provide a system which simplifies operation of the machine while eliminating one or more of the foregoing disadvantages.

SUMMARY OF THE INVENTION

Automatic steering and four-wheel steering are configured on an agricultural machine so that when automatic steering is enabled, a control system selectively activates and deactivates four-wheel steering depending on sensed turning or non-turning states of the machine. When automatic steering is enabled, the machine can automatically steer, such as according to a prescription map. In straight-away paths, corresponding to non-turning states, the control system can activate two-wheel steering. However, in the headlands of fields, corresponding to turning states, the control system can activate four-wheel steering. Such turning states can be determined based on the machines location on the map. Alternatively, such turning states can be determined based on sensed turning of the wheels. When an operator takes control of steering, such as by turning the steering wheel, automatic steering can disable, and the control system can activate four-wheel steering, to provide an optimum state for turning in the headlands of fields.

Accordingly, in one aspect of the invention, when automatic steering is enabled, the control system can default to the two-wheel steering mode. For most travel in a straight line, the two-wheel steering mode allows for maintaining a proper course with the least amount of steering correction required by not allowing the machine to be affected by impacts to the non-steering wheels. However, upon sensing entering a turn of sufficient magnitude, such as a turn greater than 30°, the machine can engage the four-wheel steering mode through the turn for optimum turning performance. Then, upon sensing exiting the turn by a sufficient magnitude, the machine can re-engage the two-wheel steering mode to continue the substantially straight operation.

In one aspect, turns of sufficient magnitude can be sensed by one or more turn angle sensors connected to either or both of the turning wheels used for two-wheel steering, or by a gyroscope or compass. In another aspect, turns of sufficient magnitude can be predicted instead of sensed, according to a sensed location on a known prescription map. The magnitude necessary for changing steering modes can include hysteresis to avoid changing too often.

Also, automatic steering and four-wheel steering can be configured to inversely cooperate with one another so that each can be in a ready state, with only one activated at any given time without requiring an operator to manipulate control functions. This can be done by providing automatic steering and four-wheel steering in a ready state and automatically engaging and disengaging based on whether an operator is manually steering. For example, automatic steering can be engaged and four-wheel steering can be disengaged when an operator is not steering through the steering wheel. When the system senses that the steering wheel is being manually turned, then automatic steering can be disengaged and four-wheel steering engaged. This can allow an operator to manually take over steering control, such as when making tight turns in a field's headlands, and use four-wheel steering without requiring the operator to manipulate four-wheel steering controls for each manual turn event.

Specifically then, one aspect of the present invention provides a steering control system for an agricultural machine having front and rear wheels. The steering control system includes: a steering controller configured to control steering in either a two-wheel steering mode in which the front wheels of the agricultural machine are steering wheels or a four-wheel steering mode in which the front and rear wheels of the agricultural machine are steering wheels, in which the steering controller controls the steering in either a manual steering mode in which turning of the steering wheels is controlled by an operator or an automatic steering mode in which turning of the steering wheels is controlled by commands that are automatically generated, in which the steering controller executes a program stored in a non-transient medium to: (a) activate the two-wheel steering mode when the automatic steering mode is enabled; and (b) selectively switch to the four-wheel steering mode when the automatic steering mode is enabled and the steering controller determines that a turn of the steering wheels is greater than a threshold.

Another aspect of the present invention provides an agricultural sprayer including: a chassis supported by front and rear wheels; a sprayer boom extending transversely relative to the chassis; an operator cab supported by the chassis, the operator cab including a steering device for manual steering of the agricultural sprayer by an operator in a manual steering mode; and a steering controller configured to control steering in either a two-wheel steering mode in which the front wheels of the agricultural sprayer are steering wheels or a four-wheel steering mode in which the front and rear wheels of the agricultural sprayer are steering wheels, in which the steering controller controls the steering in either the manual steering mode in which turning of the steering wheels is controlled by the steering wheel or an automatic steering mode in which turning of the steering wheels is controlled by commands that are automatically generated, in which the steering controller executes a program stored in a non-transient medium to: (a) activate the two-wheel steering mode when the automatic steering mode is enabled; and (b) selectively switch to the four-wheel steering mode when the automatic steering mode is enabled and the steering controller determines that a turn of the steering wheels is greater than a threshold.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
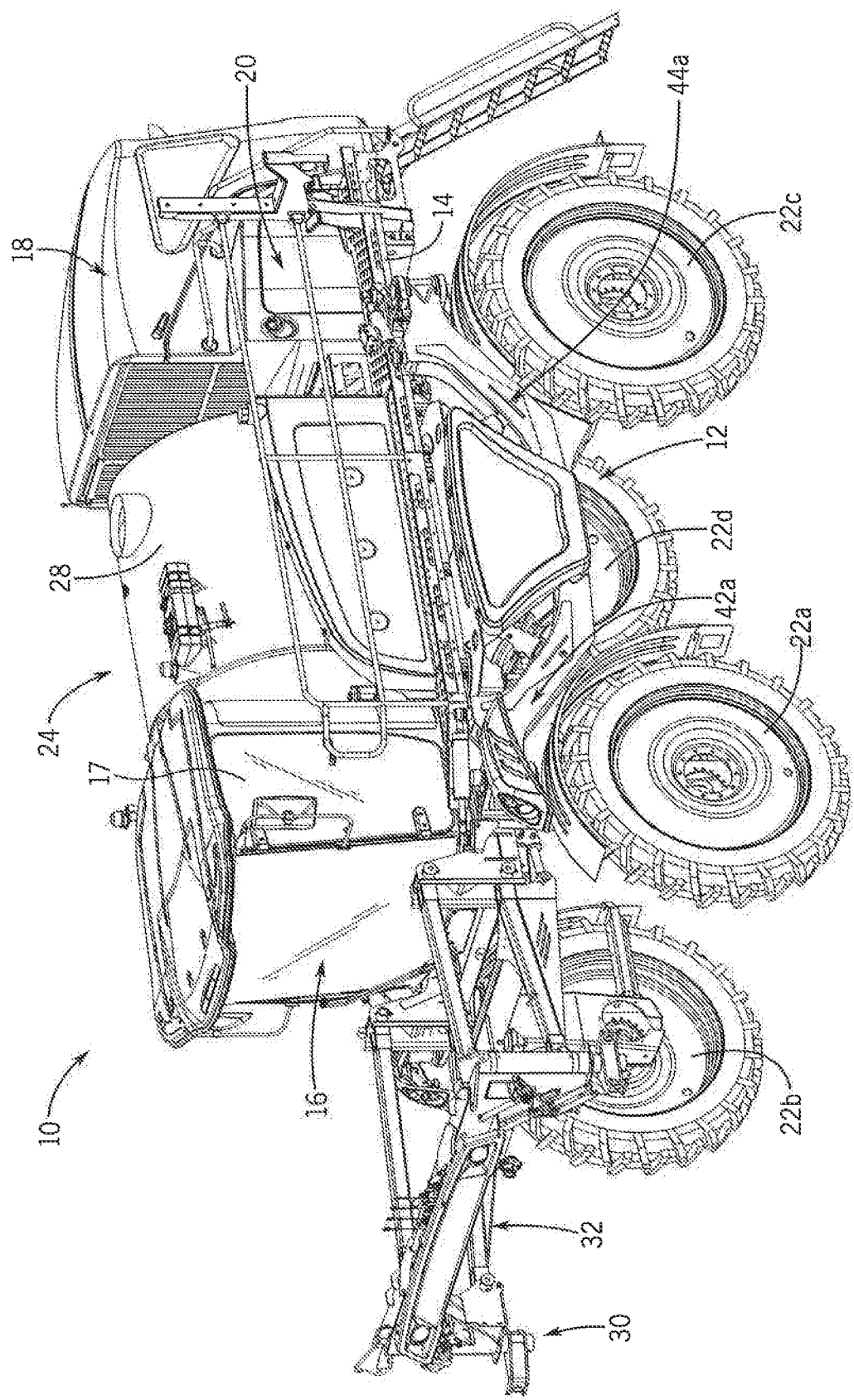
FIG. 1 is an isometric view of an exemplar agricultural machine in accordance with an aspect of the invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, a spray system 24, and an engine compartment 17 housing an engine 18 and a hydraulic system 20, among other things. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22, including front wheels 22a and 22b, and rear wheels 22c and 22d. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. The spray system 24 can include storage containers such as rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom at mount area 30 during spraying operations of sprayer 10. Groups or banks of multiple adjacent spray nozzles define multiple spray sections of the spray system. Spray sections are defined along the boom and selectively deliver product for release onto an agricultural field at locations corresponding to positions of activated spray sections. The Boom can be connected to chassis 12 with lift arm assembly 32 that is configured to move the boom up and down for adjusting the height of application of the product.

The sprayer 10 can operate in a two-wheel steering mode or a four-wheel steering mode. In the two-wheel steering mode, the front wheels 22a and 22b can be steered in the same direction (steering wheels) while the rear wheels 22c and 22d are locked straight. The two-wheel steering mode can be advantageous for operating at higher speeds and/or rough terrain. However, in the four-wheel steering mode, the front and rear wheels 22a, 22b, 22c and 22d, respectively, can all be steered in the same direction together (steering wheels). The four-wheel steering mode can be advantageous for operating at lower speeds and/or tighter turns. As used herein, the phrase "steering wheels" refers to the wheels on the ground supporting the machine which are configured in a mode to turn left or right to correspondingly steer the machine left or right.

The sprayer 10 can also operate in a manual steering mode or an automatic steering mode. In the manual steering mode, turning of the steering wheels can be controlled by an operator in the cab 16 using a steering device, such as a conventional steering wheel or joystick. However, in the automatic steering mode, turning of the steering wheels can be controlled by commands that are automatically generated in the steering control system. The automatic steering mode can be advantageous for operating according to a predetermined travel plan on prescription map, such as the prescription map described below with respect to FIG. 2. The sprayer 10 can operate in either the two-wheel steering mode or the four-wheel steering while in either the manual steering mode or the automatic steering mode.

Figure 2:
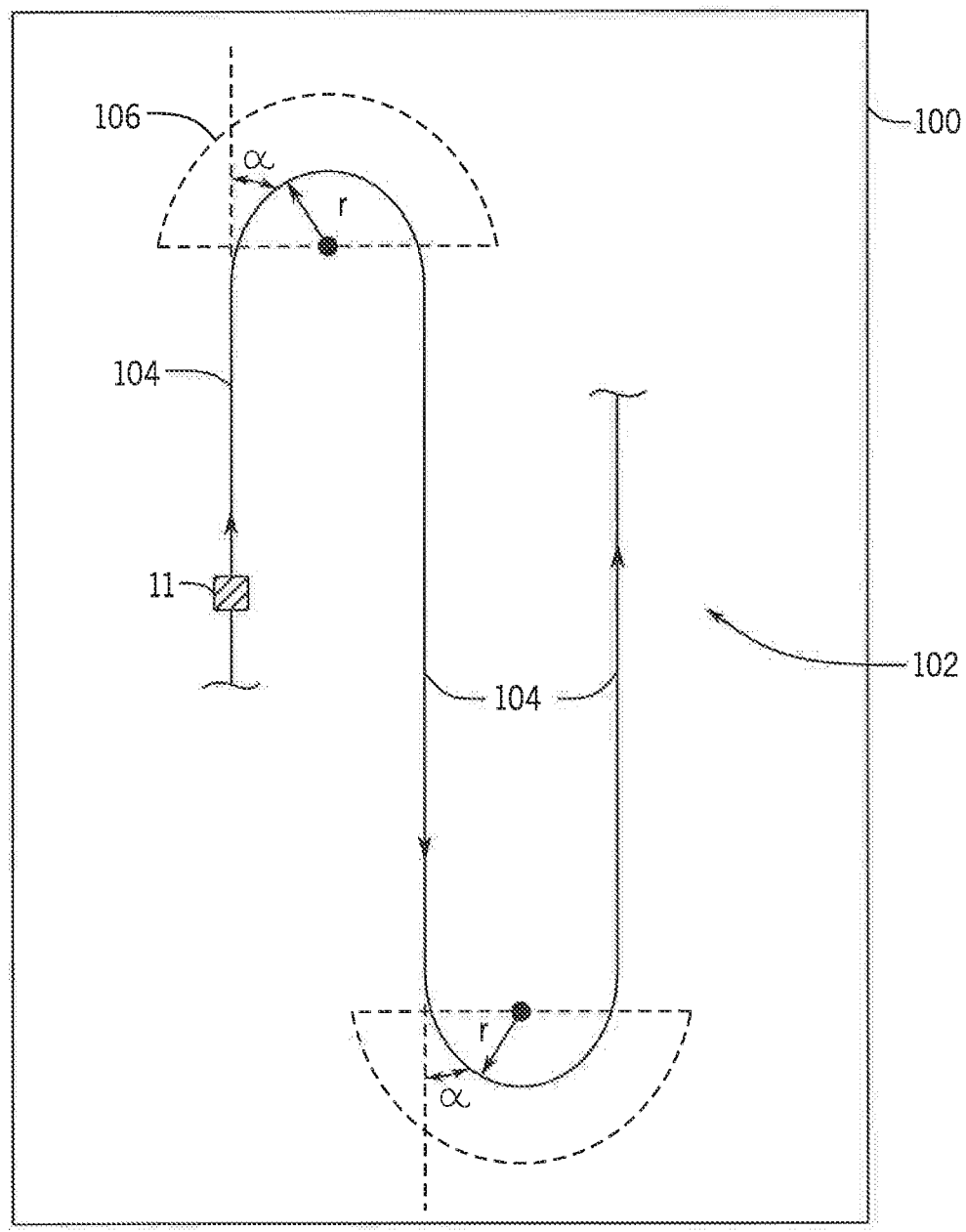
FIG. 2 is an exemplar prescription map containing a predetermined travel plan for the agricultural machine of FIG. 1.

Referring now to FIG. 2, an exemplar prescription map 100 containing a predetermined travel plan 102 on is provided in accordance with an aspect of the invention. A steering control system 115 of the sprayer 10, as will be described more fully with respect to FIG. 3, can store the prescription map 100 in a non-transient medium. To execute the prescription map 100, the sprayer 10 can be placed in the automatic steering mode. The sprayer 10 can continuously determine a current location 11 with respect to the prescription map 100 using a location sensor 154 (FIG. 3) which could be part of a Global Positioning System (GPS). The sprayer 10 can automatically propel at a predetermined speed along the travel plan 102, moving straight in straight-away paths 104, and making turns in headlands 106. In a typical agricultural field, the sprayer 10 may typically follow the travel plan 102 in a serpentine route which may align with crop rows in the field. The straightaway paths 104 may cover reasonably long distances such that two-wheel steering would be more desirable to minimize wobbling and/or vibrations of the sprayer 10. On the other hand, the headlands 106 may require a reasonably tight turning radius "r," such that four-wheel steering would be more desirable to improve steering response and decrease turning radius of the sprayer 10. Accordingly, when the automatic steering mode is enabled, a steering controller 124 of the sprayer 10 can activate the two-wheel steering mode, which may be followed in the in the straightaway paths 104. Then, still with the automatic steering mode enabled, the steering controller 124 can activate the four-wheel steering mode when the steering controller 124 determines that a turn of the steering wheels is greater than a threshold, which may be followed in the headlands 106, such as to make tight U-turns. With four-wheel steering enabled, the sprayer 10 could turn with a radius of approximately 15 feet, for example, whereas with two-wheel steering enabled, the sprayer 15 might turn with a radius of approximately 21 feet.

Figure 3:
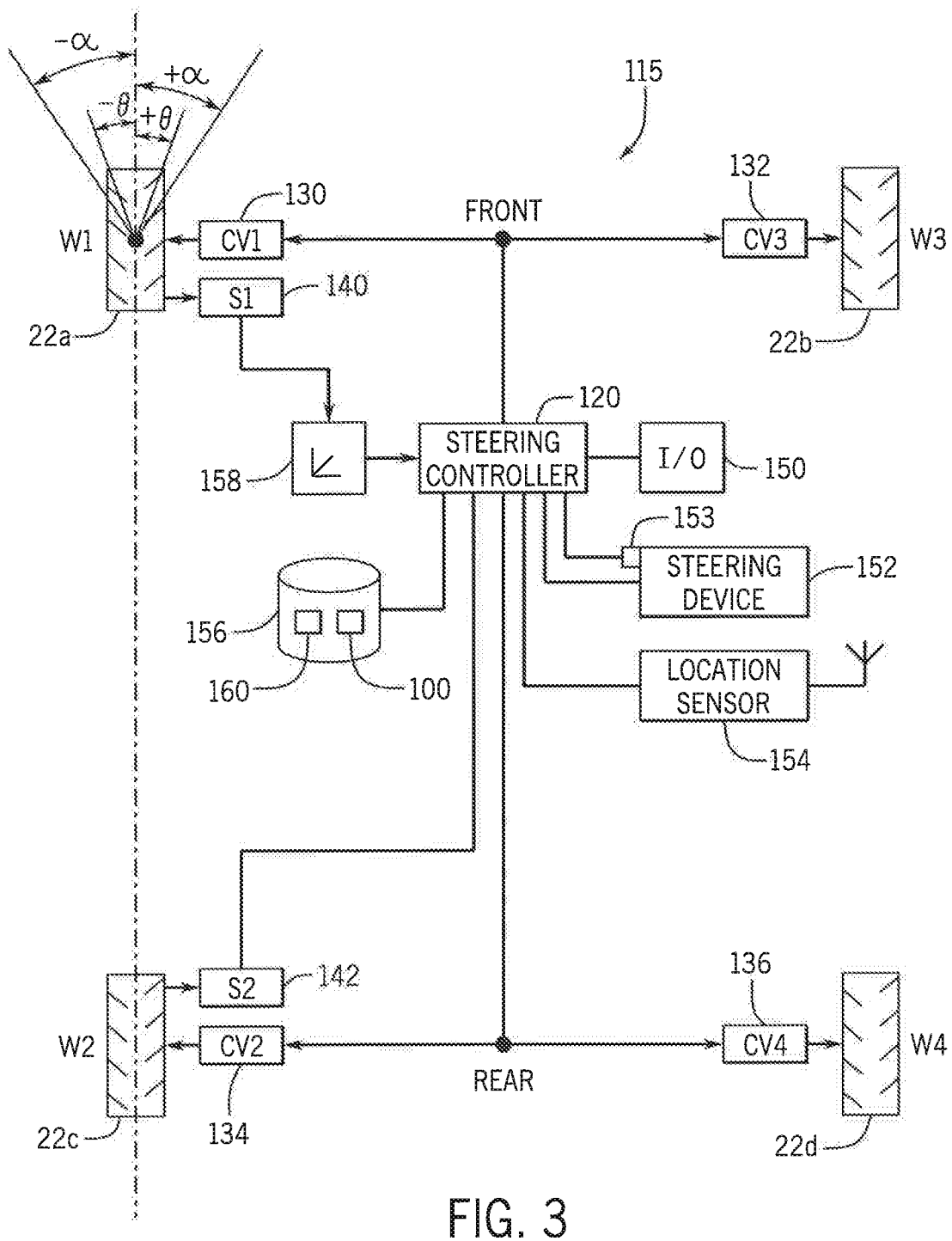
FIG. 3 is simplified schematic view of a steering control system for the agricultural machine of FIG. 1.

Referring now to FIG. 3, a simplified schematic view of a steering control system 115 for the sprayer 10 is provided in accordance with an aspect of the invention. A first front wheel 22a (labeled "W1") can be in communication with a second front wheel 22b (labeled "W2"), such as via left and right front power-transmitting driveline components 130 and 132 (labeled "CV1" and "CV3"), respectively, which may be hydraulically actuated control valves for steering the front wheels. In the automatic steering mode, the steering controller 120 may be in communication with the left and right front power-transmitting driveline components 130 and 132 for steering the first and second front wheels 22a and 22b, respectively. Similarly, a first rear wheel 22c (labeled "W2") can be in communication with a second rear wheel 22d (labeled "W4"), such as via left and right rear power-transmitting driveline components 134 and 136 (labeled "CV2" and "CV4"), respectively, which may also be hydraulically actuated control valves for steering the rear wheels. In the automatic steering mode, when selectively switching to the four-wheel steering mode, the steering controller 120 may be in communication with the left and right rear power-transmitting driveline components 134 and 136, respectively, for steering the first and second front wheels 22a and 22b, respectively.

A first wheel sensor 140 (labeled "S1") can be in communication with a front wheel, such as the first front wheel 22a. The first wheel sensor 140 can be configured to detect a turn angle of the first front wheel 22a. Optionally, a second wheel sensor 142 (labeled "S2") can in communication with the first rear wheel 22c. The second wheel sensor 142 can be configured to detect a turn angle of the first rear wheel 22c for monitoring four-wheel steering. The first and second wheel sensors 140 and 142, respectively, can be position sensors which permit absolute and/or relative position measurements linearly, angularly and/or with respect to multiple axes. The first and second sensors wheel sensors 140 and 142, respectively, could be, for example, Hall Effect sensors, and could also incorporate compasses and/or gyroscopes. One example of a wheel sensor is described further below with respect to FIG. 5.

Still referring to FIG. 3, the steering control system 115 can also include a user I/O (Input/Output) device 150, such as a touchscreen HMI (Human Machine Interface), a steering device 152, a location sensor 154, a non-transient storage medium 156, and an angle threshold detector 158, each in communication with the steering controller 120. The user I/O device 150 can be used to configure the sprayer 10, including with respect to manual activation of the two-wheel or four-wheel steering modes and the automatic steering mode. The user I/O device 150 can also be used to monitor current states of the sprayer 10, including with respect to the aforementioned modes, viewing the prescription map 100, which may be stored in the non-transient storage medium 156, and the like. The steering device 152, which could be a conventional steering wheel or joystick, may allow an operator in the cab 16 to turn the steering wheels in the manual steering mode. A steering device sensor 153 can be configured with respect to the steering device 152 to indicate motion of the steering device 152 to the steering controller 120. This can be used, for example, to allow the steering controller 120 to automatically disable the automatic steering mode when the steering device sensor 153 indicates motion of the steering device 152, such as an operator resuming control of steering the sprayer 10. In one aspect, the steering device sensor 153 could be a Hall effect sensor configured to detect a rotation of a steering wheel, an movement of a joystick, or the like. In another aspect, the steering device sensor 153 could be a pressure sensor configured to detect a steering fluid pressure change, such as change with respect to an orbital steering control valve. The location sensor 154, which could he part of a GPS, can continuously provide a current location 11 of the sprayer 10 to the steering controller 120, so as to execute the prescription map 100. The angle threshold detector 158 can receive an electrical signal representing a turn angle of the first front wheel 22a as detected by the first wheel sensor 140. Various aspects of the steering control system 115 may be integrated into one or more components, and/or with varying levels of software integration, within the scope of the invention.

Figure 4:
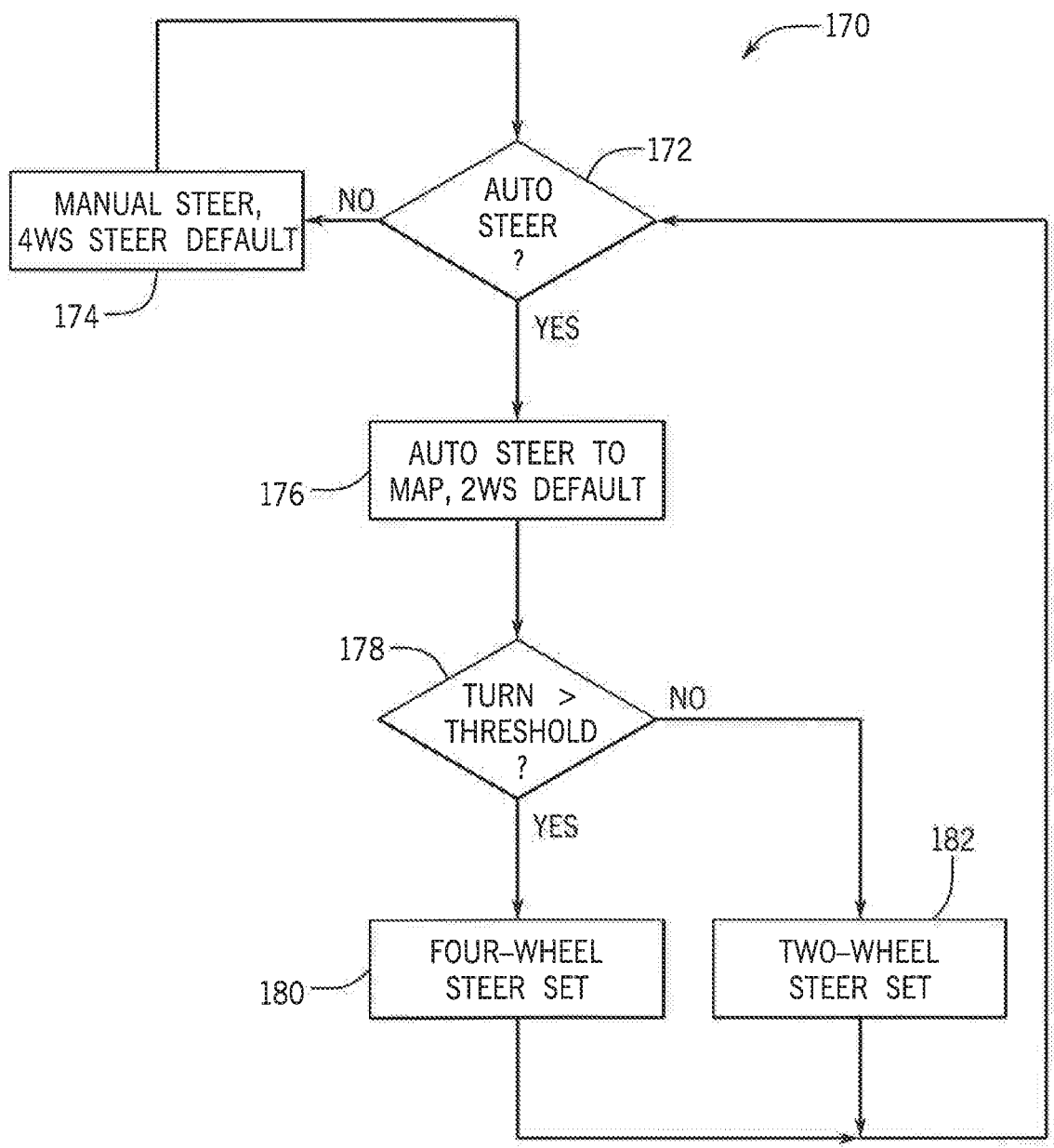
FIG. 4 is a flow chart for operation of the steering control system of FIG. 3.

With additional reference to FIG. 4, the steering controller 120 can execute a program 160 stored in the non-transient storage medium 156 to implement a process 170 for operation of the steering control system 115. In a first decision step 172, the steering controller 120 can determine whether the sprayer 10 is in the automatic steering mode. The sprayer 10 can he put in the automatic steering mode, for example, by an operator's selection via the user I/O device 150. If the sprayer 10 is not in the automatic steering mode, then the process 170 can continue to step 174 in which the sprayer 15 is configured in the manual steering mode in which turning of the steering wheels is controlled by the operator via the steering device. Moreover, the sprayer 15 defaults to the four-wheel steering mode, and remains in the four-wheel steering mode unless changed by an operator's selection via the user I/O device 150. The process 170 can continue in a manual steering loop, in the manual steering mode, defaulting to the four-wheel steering mode unless changed by the operator, while continuously monitoring for selection of the automatic steering mode.

However, if the sprayer 10 is put in the automatic steering mode, then the process 170 can continue to step 176 in which the sprayer 15 is configured in the automatic steering mode in which turning of the steering wheels is controlled by commands that are automatically generated by the steering controller 120. Such commands can be generated, for example, to turn left or right at predetermined speeds, so as to execute the prescription map 100 along the travel plan 102 (FIG. 2). In addition, the steering controller 120 can activate the two-wheel steering mode, so that the sprayer 15 defaults to the two-wheel steering mode. Then, at a second decision step 178, the steering controller 120 continuously determines whether turns of the steering wheels are greater than a threshold. In one aspect, turns of a sufficient magnitude, exceeding an angle $\alpha$ (FIG. 3), such as 30°, can be sensed by the first wheel sensor 140 as being greater than the threshold. However, in another aspect, the steering controller 120 can execute to compare the location of the sprayer 10 to the prescription map 100 to determine when a turn of the steering wheels is greater than the threshold. In this aspect, turns of a sufficient magnitude, exceeding the angle $\alpha$ (FIG. 2), can be predicted instead of sensed, such as according to the current location 11 that, as being greater than the threshold. If the steering controller 120 determines that a turn of the steering wheels is greater than the threshold (exceeding the angle $\alpha$), then the process 170 can continue to step 180 in which the steering controller 120 can selectively activate the four-wheel steering mode. The process 170 can then return to the first decision step 172, in a four-wheel steering loop, in the automatic and four-wheel steering modes, while monitoring for continued selection of the automatic steering mode and the turn of the steering wheels being greater than the threshold. However, if at the second decision step 178 the steering controller 120 determines that the turn is no longer greater than the threshold, the process 170 can instead proceed to step 182 in which the two-wheel steering mode activated by the steering controller 120. Moreover, the process 170 can similarly return to the first decision step 172, in a two-wheel steering loop, in the automatic and two-wheel steering modes, while monitoring for continued selection of the automatic steering mode and the turn of the steering wheels not being greater than the threshold. Should the two-wheel steering loop or the four-wheel steering loop be broken by deactivation of the automatic steering mode, the process 170 can exit to step 174 and the manual steering loop, defaulting to the four-wheel steering mode, and monitoring for re-activation of the automatic steering mode. Deactivation of the automatic steering mode could occur, for example, based on an operator's selection via the user I/O device 150, detection by the steering device sensor 153, or the like.

Figure 5:
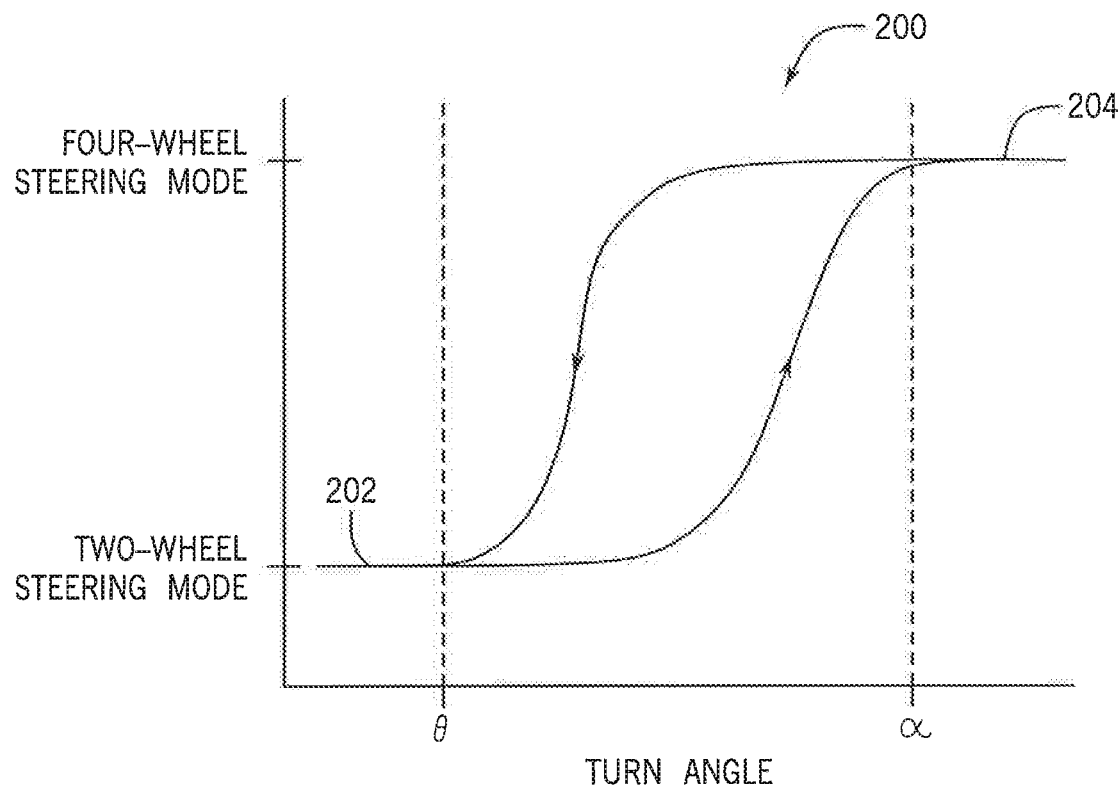
FIG. 5 is a graph illustrating hysteresis for selectively switching to the four-wheel steering mode according to the present invention.

Referring now to FIG. 5, in another aspect of the invention, the steering controller 120 can provide hysteresis for selectively switching to the four-wheel steering mode to avoid changing too often between the two-wheel and four-wheel steering modes. As illustrated in graph 200, the steering controller 120, when in the automatic steering mode, can selectively switch from a first state 202, corresponding to the two-wheel steering mode, to a second state 204, corresponding to the four-wheel steering mode, when the steering controller 120-determines that a turn of the steering wheels is greater than the threshold $\alpha$, such as 30°. However, instead of returning to the first state 202, corresponding to the two-wheel steering mode, when the turn is no longer greater than the threshold $\alpha$, the steering controller 120 can instead return to the first state 202 at a different threshold, such as when the turn is no longer greater than a second threshold $\theta$, such as 15°. Preferably, the thresholds ($\alpha$ and $\theta$) are at least 10° apart. As a result, the steering controller 120 can prevent the steering mode from changing too frequently.

Figure 6:
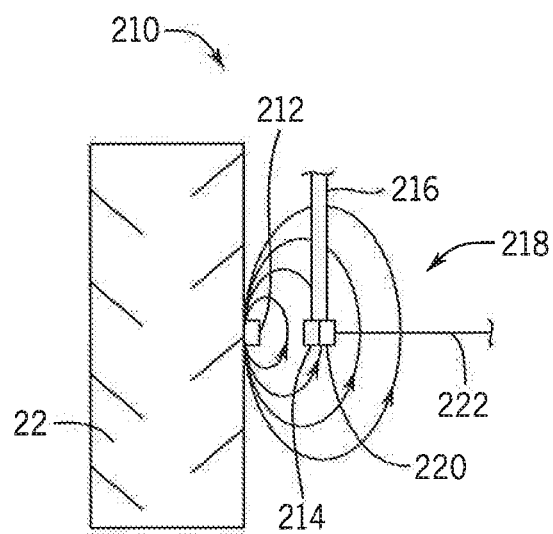
FIG. 6 is an exemplar sensor for detecting a turn angle of a wheel.

Referring now to FIG. 6, an exemplar wheel sensor 210 for detecting a turn angle of a wheel 22, which could serve for the first wheel sensor 140, is provided according to an aspect of the invention. Similar to a Hall Effect sensor, the wheel sensor 210 may include a first magnetic element 212 positioned with respect to a wheel 22, such as the first front wheel 22a, and a second magnetic element 214 positioned with respect to a supporting structure 216 proximal to the wheel 22. The first magnetic element 212 produces a magnetic field 218, and as the wheel 22 turns, the strength of the magnetic field 218 as detected by the second magnetic element 214 will vary. Accordingly, the second magnetic element 214, coupled to an electromagnetic circuit 220, may operate as a transducer to provide an electrical signal 222 with a varying output voltage corresponding to a strength of the magnetic field 218 and thus the turn angle of the wheel 22, which can be compared to the threshold.

Many changes and modifications could be made to the invention without departing from the spirit thereof. The scope of these changes will become apparent from the appended claims.

We claim:

1. A steering control system for an agricultural machine having front and rear wheels, the steering control system comprising:
    a steering controller configured to control steering in either a two-wheel steering mode in which the front wheels of the agricultural machine are steering wheels or a four-wheel steering mode in which the front and rear wheels of the agricultural machine are steering wheels, wherein the steering controller controls the steering in either a manual steering mode in which turning of the steering wheels is controlled by an operator or an automatic steering mode in which turning of the steering wheels is controlled by commands that are automatically generated, wherein the steering controller executes a program stored in a non-transient medium to:
    automatically activate the two-wheel steering mode when the automatic steering mode is enabled;
    automatically activate the four-wheel steering mode when the manual steering mode is enabled; and
    selectively switch to the four-wheel steering mode when the automatic steering mode is enabled and the steering controller determines that a turn of the steering wheels is greater than a threshold.

2. The steering control system of claim 1, further comprising a sensor configured to provide a location of the agricultural machine to the steering controller, wherein the steering controller determines that a turn of the steering wheels is greater than the threshold based on the location.

3. The steering control system of claim 2, wherein the sensor is part of a Global Positioning System (GPS).

4. The steering control system of claim 2, wherein the steering controller further executes to compare the location to a prescription map to determine when a turn of the steering wheels is greater than the threshold.

5. The steering control system of claim 4, wherein the threshold is 30°.

6. The steering control system of claim 1, wherein the threshold is a first threshold, and wherein, after selectively switching to the four-wheel steering mode, the steering controller further executes to maintain the four-wheel steering mode until the steering controller determines that a turn of the steering wheels is less than a second threshold.

7. The steering control system of claim 6, wherein the first and second thresholds are at least 10° apart.

8. The steering control system of claim 1, further comprising a sensor configured to provide a turn angle of a front wheel of the agricultural machine to the steering controller, wherein the steering controller determines that a turn of the steering wheels is greater than the threshold based on a measurement by the sensor.

9. The steering control system of claim 1, further comprising a steering device for manual steering by an operator and a sensor configured to indicate motion of the steering device to the steering controller, wherein the steering controller further executes to disable the automatic steering mode when the sensor indicates motion of the steering device.

10. The steering control system of claim 9, wherein the steering controller further executes to activate the four-wheel steering mode when the automatic steering mode is disabled.

11. An agricultural sprayer comprising:
a chassis supported by front and rear wheels;
a sprayer boom extending transversely relative to the chassis;
an operator cab supported by the chassis, the operator cab including a steering device for manual steering of the agricultural sprayer by an operator in a manual steering mode; and
a steering controller configured to control steering in either a two-wheel steering mode in which the front wheels of the agricultural sprayer are steering wheels or a four-wheel steering mode in which the front and rear wheels of the agricultural sprayer are steering wheels, wherein the steering controller controls the steering in either the manual steering mode in which turning of the steering wheels is controlled by the steering wheel or an automatic steering mode in which turning of the steering wheels is controlled by commands that are automatically generated, wherein the steering controller executes a program stored in a non-transient medium to:
automatically activate the two-wheel steering mode when the automatic steering mode is enabled;
automatically activate the four-wheel steering mode when the manual steering mode is enabled; and
selectively switch to the four-wheel steering mode when the automatic steering mode is enabled and the steering controller determines that a turn of the steering wheels is greater than a threshold.

12. The agricultural sprayer of claim 11, further comprising a sensor configured to provide a location of the agricultural sprayer to the steering controller, wherein the steering controller determines that a turn of the steering wheels is greater than the threshold based on the location.

13. The agricultural sprayer of claim 12, wherein the sensor is part of a Global Positioning System (GPS).

14. The agricultural sprayer of claim 12, wherein the steering controller further executes to compare the location to a prescription map to determine when a turn of the steering wheels is greater than the threshold.

15. The agricultural sprayer of claim 14, wherein the threshold is 30°.

16. The agricultural sprayer of claim 11, wherein the threshold is a first threshold, and wherein, after selectively switching to the four-wheel steering mode, the steering controller further executes to maintain the four-wheel steering mode until the steering controller determines that a turn of the steering wheels is less than a second threshold.

17. The agricultural sprayer of claim 16, wherein the first and second thresholds are at least 10° apart.

18. The agricultural sprayer of claim 11, further comprising a sensor configured to provide a turn angle of a front wheel of the agricultural sprayer to the steering controller, wherein the steering controller determines that a turn of the steering wheels is greater than the threshold based on a measurement by the sensor.

19. The agricultural sprayer of claim 11, further comprising a sensor configured to indicate motion of the steering device to the steering controller, wherein the steering controller further executes to disable the automatic steering mode when the sensor indicates motion of the steering device.

20. The agricultural sprayer of claim 19, wherein the steering controller further executes to activate the four-wheel steering mode when the automatic steering mode is disabled.

* * * * *